(12) United States Patent
Murosaki et al.

(10) Patent No.: US 11,970,413 B2
(45) Date of Patent: Apr. 30, 2024

(54) ELECTRIC VACUUM CLEANING APPARATUS AND CLEANING HEAD

(71) Applicant: Toshiba Lifestyle Products & Services Corporation, Kawasaki (JP)

(72) Inventors: Takahiro Murosaki, Owariasahi (JP); Hironori Sasaki, Nagoya (JP)

(73) Assignee: Toshiba Lifestyle Products & Services Corporation, Kawasaki (JP)

( * ) Notice: Subject to any disclaimer, the term of this patent is extended or adjusted under 35 U.S.C. 154(b) by 1133 days.

(21) Appl. No.: 16/677,833

(22) Filed: Nov. 8, 2019

(65) Prior Publication Data
US 2020/0165147 A1 May 28, 2020

(30) Foreign Application Priority Data

Nov. 28, 2018 (JP) .................................. 2018-222710

(51) Int. Cl.
| | |
|---|---|
| C02F 1/461 | (2023.01) |
| A47L 11/03 | (2006.01) |
| A47L 11/20 | (2006.01) |
| A47L 11/30 | (2006.01) |
| C02F 103/02 | (2006.01) |

(52) U.S. Cl.
CPC ............. *C02F 1/461* (2013.01); *A47L 11/03* (2013.01); *A47L 11/201* (2013.01); *A47L 11/30* (2013.01); *C02F 2103/02* (2013.01)

(58) Field of Classification Search
None
See application file for complete search history.

(56) References Cited

U.S. PATENT DOCUMENTS

| | | | |
|---|---|---|---|
| 2003/0159233 A1* | 8/2003 | Oh ............................ | A47L 9/02 15/327.1 |
| 2008/0041230 A1* | 2/2008 | Takahashi ................ | F24F 8/10 96/234 |
| 2016/0174803 A1* | 6/2016 | Vines .................... | B01D 46/446 55/482 |

(Continued)

FOREIGN PATENT DOCUMENTS

| | | |
|---|---|---|
| JP | 2-68020 A | 3/1990 |
| JP | 10-057283 A | 3/1998 |
| JP | 2002-263042 A | 9/2002 |

(Continued)

*Primary Examiner* — Natasha N Campbell
*Assistant Examiner* — Pradhuman Parihar
(74) *Attorney, Agent, or Firm* — Oblon, McClelland, Maier & Neustadt, L.L.P.

(57) ABSTRACT

To provide an electric vacuum cleaning apparatus and a cleaning head can continuously perform both of suction cleaning and wiping for disinfecting the surface to be cleaned together. The apparatus includes: an electric blower that generates suction vacuum pressure; a suction air passage equipped with a suction port and fluidly connected to a suction side of the electric blower; an electrolyzed-water generator that electrolyzes water to produce electrolyzed water containing hypochlorous acid; a wiping-member attachment to which a wiping member is detachably attached; and a supply mechanism that supplies the electrolyzed water to at least one of a surface to be cleaned and the wiping member that is attached to the wiping-member attachment.

17 Claims, 4 Drawing Sheets

(56) References Cited

U.S. PATENT DOCUMENTS

2018/0360287 A1* 12/2018 Gray ..................... A47L 13/22

FOREIGN PATENT DOCUMENTS

| JP | 2003-250721 A | 9/2003 |
| JP | 2005-006816 A | 1/2005 |
| JP | 2006-130050 A | 5/2006 |
| JP | 2006-175043 A | 7/2006 |
| JP | 2006-175043 A5 | 7/2006 |
| JP | 2016-86981 A | 5/2016 |

* cited by examiner

ELECTRIC VACUUM CLEANING APPARATUS AND CLEANING HEAD

CROSS-REFERENCE TO RELATED APPLICATIONS

This application claims the benefit of priority of Japanese Patent Application No. 2018-222710, filed on Nov. 28, 2018, the entire contents of which are incorporated herein by reference.

BACKGROUND OF THE INVENTION

Field of the Invention

Embodiments according to the present invention relate to an electric vacuum cleaning apparatus and a cleaning head.

Description of the Related Art

There is known an electric vacuum cleaner that includes: a water supply means that is detachably installed in its cleaner body for storing a predetermined amount of water inside; an electrolyzed-water generator that electrolyzes the water supplied from the water supply means into alkaline ionized water and acidic ionized water; an injection device that sprays each of the generated alkaline ionized water and acidic ionized water onto the floor surface in the form of mist; a driving means that sucks dust on the floor surface; and a roller means for being rotationally driven to rub off the dust on the floor surface together with the sprayed ionized water (for example, JP H10-057283 A).

In this context, there is known a flooring wiper used for wiping and cleaning the surface to be cleaned (i.e., floor surface). Flooring wipers include a dry type for wiping the floor surface with a dry sheet, and a wet type for wiping the floor surface with a wet sheet. In the case of dry wiping, it is difficult to disinfect the floor surface and to remove dirt of organic matter such as sebum having adhered to the floor surface. In the case of water wiping, it is possible to disinfect the floor surface and remove dirt of organic matter such as sebum having adhered to the floor surface, but these effects decrease when the wet sheet dries out.

SUMMARY OF THE INVENTION

To solve the problem described above, it is an object of the present invention to provide an electric vacuum cleaning apparatus and a cleaning head, each of which can continuously perform both of suction cleaning for sucking in dust on the surface to be cleaned and wiping for disinfecting the surface to be cleaned together.

To achieve the above object, an electric vacuum cleaning apparatus includes: an electric blower that generates suction vacuum pressure; a suction air passage equipped with a suction port and fluidly connected to a suction side of the electric blower; an electrolyzed-water generator that electrolyzes water to produce electrolyzed water containing hypochlorous acid; a wiping-member attachment to which a wiping member is detachably attached; and a supply mechanism that supplies the electrolyzed water to at least one of a surface to be cleaned and the wiping member that is attached to the wiping-member attachment.

Moreover, a cleaning head equipped with a suction port of a suction air passage that is spatially connected to an electric blower. The cleaning head includes: an electrolyzed water generator that electrolyzes water to produce electrolyzed water containing hypochlorous acid; a wiping-member attachment to which a wiping member is detachably attached; and a supply mechanism that supplies the electrolyzed water to at least one of a surface to be cleaned and the wiping member that is attached to the wiping-member attachment.

DETAILED DESCRIPTION

Hereinbelow, a description will be given of an electric vacuum cleaning apparatus and its cleaning head according to embodiments of the present invention by referring to FIG. 1 to FIG. 4. The same reference signs are given for identical or equivalent components in each figure.

Figure 1:
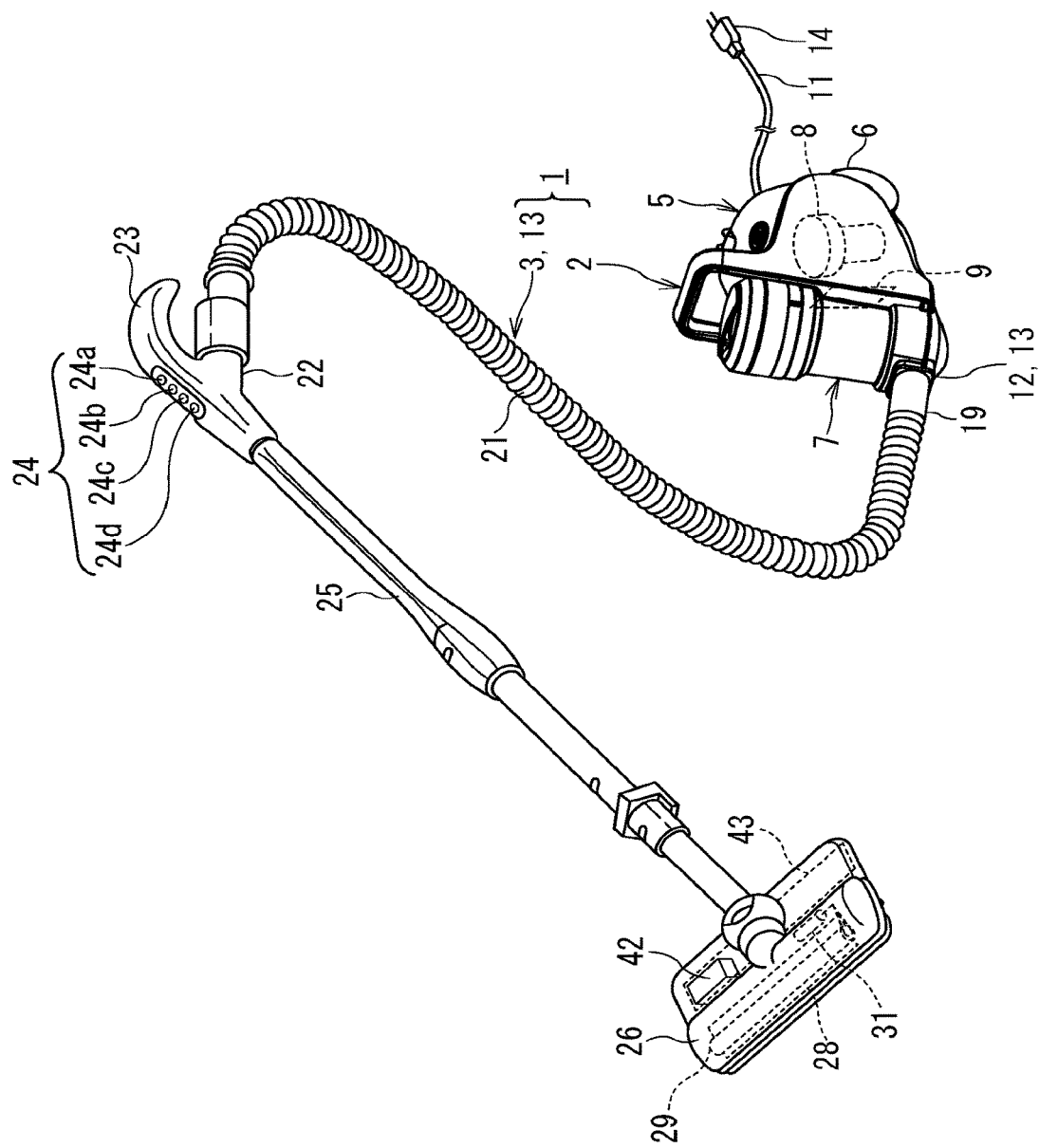
FIG. 1 is a perspective view illustrating a first aspect of an electric vacuum cleaning apparatus according to one embodiment of the present invention.

FIG. 1 is a perspective view of the electric vacuum cleaning apparatus according to the embodiment of the present invention.

As shown in FIG. 1, the electric vacuum cleaning apparatus 1 according to the present embodiment is, for example, a canister type electric vacuum cleaner.

The electric vacuum cleaning apparatus 1 is not limited to the canister type electric vacuum cleaner. The electric vacuum cleaning apparatus 1 may be configured as an upright type, a stick type, or a handy type electric vacuum cleaner. Further, the electric vacuum cleaning apparatus 1 may be an autonomous vacuum cleaner capable of moving on the surface to be cleaned by autonomous control.

The electric vacuum cleaning apparatus 1 includes a cleaner body 2 capable of moving on the surface to be cleaned and a hose 3 detachably connected to the cleaner body 2. The hose 3 is fluidly connected to the cleaner body 2. A user can move the cleaner body 2 by pulling the hose 3.

The cleaner body 2 includes a body housing 5, a pair of wheels 6 provided on the respective right and left sides of the body housing 5, a dust separation device 7 detachably attached to the body housing 5, an electric blower 8 accommodated in the body housing 5, a cleaner controller 9 mainly for controlling the electric blower 8, and a power cord 11 for leading power to the electric blower 8.

The cleaner body 2 drives the electric blower 8 by the power supplied through the power cord 11. The cleaner body 7 applies negative pressure generated by driving the electric blower 8 to the hose 3. The electric vacuum cleaning apparatus 1 sucks in dust-containing air from the surface to be cleaned through the hose 3, separates the dust from the inhaled dust-containing air, collects and accumulates the dust after separation, and exhausts the clean air from which the dust has been removed.

The body housing 5 includes a connection port 12 corresponding to the suction port of the cleaner body 2. The connection port 12 is a coupling joint to/from which the hose 3 can be attached and detached. The connection port 12 fluidly connects the hose 3 and the dust separation device 7. The connection port 12 enables easy attachment and detachment of the hose 3 to/from the cleaner body 2. The connection port 12 opens toward the front of the body housing 5. Further, the connection port 12 is disposed on the center line extending in the front-and-rear direction or straight advance direction of the cleaner body 2. Thus, a user can move the electric vacuum cleaning apparatus 1 as intended by pulling the hose 3.

The right and left wheels 6 support the cleaner body 2 such that the cleaner body 2 can move on the surface to be cleaned. The wheels 6 are arranged such that the rotation center line of the right wheel 6 and the rotation center line of the left wheel 6 substantially on the same line. Thus, the user can pull the hose 3 so as to smoothly advance the cleaner body 2 and turn it to the right or left.

The dust separation device 7 separates, collects, accumulates the dust from the dust-containing air, which flows into the cleaner body 2 from the connection port 12 or the hose 3, and sends the clean air from which dust has been removed to the electric blower 8. The dust separation device 7 is a separation device that separates dust from dust-containing air by, for example, centrifugation (cyclone separation). The dust separation device 7 may be another type of separation device that separates dust from dust-containing air with a filter for filtering and collecting dust (for example, a dust collection bag such as a so-called paper duct bag) under the straight-flow type separation, in which dust is separated from air by difference of inertia force between dust and air going straight.

The electric blower 8 is driven by the power supplied through the power cord 11. The electric blower 8 sucks in air from the dust separation device 7 so as to generate suction vacuum pressure. The air passage that reaches the suction side of the electric blower 8 from the connection port 12 through the dust separation device 7 is a part of the suction air passage 13 fluidly connected to the suction side of the electric blower 8.

The cleaner controller 9 mainly adjusts start, stop, and output of the electric blower 8. The cleaner controller 9 includes a microprocessor and a storage device for storing, for example, parameters and various operation programs executed with the microprocessor. The storage device stores various settings (arguments) related to plural preset operation modes. The plural operation modes are related to the output of the electric blower 8. Different input values, i.e., input values of the electric blower 8 and current values flowing to the electric blower 8 are set for each operation mode. Each operation mode is associated with a user's operation received with the hose 3. The cleaner controller 9 alternatively selects an arbitrary operation mode corresponding to the user's operation received with the hose 3 from the plural preset operation modes, and reads out the selected operation mode from the storage device so as to drive the electric blower 8 on the basis of the settings of the operation mode having been read out.

The power cord 11 supplies power to the cleaner body 2 from a plug-in connector for wiring, a so-called power outlet. At the free end of the power cord 11, an attachment plug 14 is provided. The electric vacuum cleaning apparatus 1 may be a so-called cordless type in which the cleaner body 2 is provided with a power source, for example, a rechargeable battery.

The hose 3 is a part of the suction air passage 13 fluidly connected to the suction side of the electric blower 8.

The hose 3 sucks dust-containing air from the surface to be cleaned by the negative pressure that acts from the cleaner body 2, and leads the dust-containing air to the cleaner body 2. The hose 3 includes: a connecting tube 19 as a joint detachably connected to the cleaner body 2; a dust collecting hose 21 fluidly connected to the connecting tube 19; a hand operation tube 22 fluidly connected to the dust collecting hose 21; a grip 23 protruding from the hand operation tube 22; an input unit 24 provided on the grip 23; an extension tube 25 detachably connected to the hand operation tube 22; and a cleaning head 26 detachably connected to the extension tube 25.

The connecting tube 19 is the joint that is detachable with respect to the connection port 12, and is fluidly connected to the dust separation device 7 through the connection port 12. The connection pipe 19 enables easy attachment and detachment of the hose 3 to/from the cleaner body 2.

The dust collecting hose 21 is a long, flexible, and substantially cylindrical hose. One end (i.e., the rear end in this case) of the dust collecting hose 21 is fluidly connected to the connecting tube 19. The dust collecting hose 21 is fluidly connected to the dust separation device 7 through the connecting tube 19. A user can direct the hand operation tube 22, the extension tube 25 and the cleaning head 26 in any direction with the flexible dust collecting hose 21.

The hand operation tube 22 relays the dust collecting hose 21 and the extension tube 25. One end (i.e., the rear end in this case) of the hand operation tube 22 is fluidly connected to the other end (i.e., the front end in this case) of the dust collecting hose 21. The hand operation tube 22 is fluidly connected to the dust separation device 7 through the dust collecting hose 21 and the connecting tube 19.

The grip 23 is a portion that is gripped by a user's hand for operating the electric vacuum cleaning apparatus 1. The grip 23 protrudes from the hand operation tube 22 in an appropriate shape that can be easily grasped by the user's hand. A user can direct the extension tube 25 and the cleaning head 26 in any direction by holding the grip 23.

The input unit 24 includes switches corresponding to the respective operation modes. For example, the input unit 24 includes: a stop switch 24a corresponding to the operation of stopping the electric blower 8; a start switch 24b corresponding to the operation of starting the electric blower 8; and a brush switch 24c corresponding to power supply and power shutoff with respect to the cleaning head 26. The stop switch 24a and the start switch 24b transmit an operation signal to the cleaner controller 9 by wire or wirelessly. A user of the electric vacuum cleaning apparatus 1 can operate the input unit 24 to alternatively select one of the operation modes of the electric blower 8. The start switch 24b also functions as a selecting switch of the operation modes during operation of the electric blower 8. In this case, each time the cleaner controller 9 receives an operation signal from the start switch 24b, the cleaner controller 9 switches the operation mode in order of strong→medium→weak-→strong→medium→weak→ .... Instead of the start switch 24b, the input unit 24 may be individually provided with a strong-mode operation switch, a medium-mode operation switch, and a weak-mode operation switch.

The extension tube 25 has a telescopic structure in which a plurality of tubular bodies are superimposed, and can be expanded and contracted. A joint structure is provided at one end (i.e., the rear end in this case) of the extension tube 25, and this joint structure is detachable with respect to the other end (i.e., the front end in this case) of the hand operation tube 22. The extension tube 25 is fluidly connected to the dust separation device 7 through the hand operation tube 22, the dust collecting hose 21, and the connecting tube 19. A user can appropriately cope with the height and/or width of the place to be cleaned by expanding or contracting the extension tube 25.

The cleaning head 26 can run or slide on the surface to be cleaned such as a wooden floor and a carpet. The cleaning head 26 has a bottom face that faces the surface to be cleaned in a running state or a sliding state. On this bottom face of the cleaning head 26, a suction port 28 is provided. The cleaning head 26 includes a rotatable brush 29 arranged at the suction port 28 and an electric motor 31 for driving the rotatable brush 29. A joint structure is provided on one end (i.e., the rear end in this case) of the cleaning head 26, and this joint structure is attachable to and detachable from the other end (i.e., the front end in this case) of the extension tube 25. The cleaning head 26 is fluidly connected to the dust separation device 7 through the extension tube 25, the hand operation tube 22, the dust collecting hose 21, and the connecting tube 19. That is, the cleaning head 26, the extension tube 25, the hand operation tube 22, the dust collecting hose 21, the connecting tube 19, and the dust separation device 7 constitute a suction air passage from the suction port 28 to the electric blower 8. Each time the electric motor 31 receives the operation signal from the brush switch 24*c*, the electric motor 31 alternately repeats the operation start and the operation stop.

In addition, the cleaning head 26 is provided with an electrolyzed-water generator 42 that electrolyzes water to produce electrolyzed water containing hypochlorous acid. The input unit 24 includes a water wiping switch 24*d* that receives an operation to switch between permission and non-permission of the electrolyzed water. The cleaning head 26 is provided with a wiping member 43 that is for wiping the electrolyzed water sprayed on the surface to be cleaned or for wetting with the electrolyzed water and spreading the electrolyzed water to the surface to be cleaned. In other words, the electric vacuum cleaning apparatus 1 disinfects the surface to be cleaned by spraying or spreading the electrolyzed water containing hypochlorous acid to this surface while moving. The act of wiping off the electrolyzed water sprayed by the wiping member 43 on the surface to be cleaned is called "dry wiping". The act of spreading the electrolyzed water on the surface to be cleaned with the moist wiping member 43 containing the electrolyzed water is called "water wiping".

The wiping member 43 is any one of various hygroscopic cleaning tools such as a wiper sheet, a duster cloth, a floorcloth, and a mop (lump of fibers at the tip excluding the handle portion), for example. The wiping member 43 is provided on the bottom of the cleaning head 26. The wiping member 43 contacts the surface to be cleaned when the cleaning head 26 is placed on the surface to be cleaned.

When the start switch 24*b* is operated, the electric vacuum cleaning apparatus 1 starts up the electric blower 8. For example, when the start switch 24*b* is operated when the electric blower 8 is stopped, first, the electric vacuum cleaning apparatus 1 starts the electric blower 8 in the strong operation mode. When the start switch 24*b* is operated again in the strong operation mode, the electric vacuum cleaning apparatus 1 switches the operation mode of the electric blower 8 to the medium operation mode. When the start switch 24*b* is operated three times, the electric vacuum cleaning apparatus 1 switches the operation mode of the electric blower 8 to the weak operation mode. In this manner, every time the start switch 24*b* is operated, the above-described mode switching is repeated. The strong operation mode, the medium operation mode, and the weak operation mode are plural predetermined operation modes. The input value to the electric blower 8 is the largest in the strong operation mode and is the smallest in the weak operation mode. The electric blower 8 having started up sucks in air from the dust separation device 7 so as to bring the inside of the dust separation device 7 into a negative pressure state.

The negative pressure inside the dust separation device 7 sequentially passes through the connection port 12, the connecting tube 19, the dust collecting hose 21, the hand operation tube 22, the extension tube 25, and the cleaning head 26 so as to act on the suction port 28. The electric vacuum cleaning apparatus 1 sucks in the dust on the surface to be cleaned together with the air by the negative pressure acting on the suction port 28. The dust separation device 7 separates, collects, and accumulates the dust from the dust-containing air having been sucked into the electric vacuum cleaning apparatus 1, and sends the air having been separated from the dust-containing air to the electric blower 8. The electric blower 8 discharges the air sucked from the dust separation device 7 to the outside of the cleaner body 2. Hereinafter, such a cleaning function of the electric vacuum cleaning apparatus 1 is referred to as "the suction cleaning function" or simply referred to as "suction cleaning".

In addition, when the water wiping switch 24*d* is turned on, the electric vacuum cleaning apparatus 1 supplies power to the electrolyzed-water generator 42 and causes the electrolyzed-water generator 42 to generate electrolyzed water. The electric vacuum cleaning apparatus 1 can wipe the surface to be cleaned with the wiping member 43 with electrolyzed water. When moving along with cleaning, the electric vacuum cleaning apparatus 1 wipes the surface to be cleaned with the wiping member 43. The wiping function of the electric vacuum cleaning apparatus 1 includes dry wiping for wiping off electrolytic water having been sprayed and remained on the surface to be cleaned without evaporation or dry wiping for simply wiping off moisture. The wiping function of the electric vacuum cleaning apparatus 1 further includes water wiping with the use of electrolyzed water, i.e., water wiping in which the wiping member 43 is wetted with electrolyzed water and this electrolyzed water is spread onto the surface to be cleaned with the wiping member 43 for disinfecting the surface to be cleaned.

As to whether wiping with the wiping member 43 is performed as dry wiping or water wiping, it depends on the amount of electrolyzed water sprayed from the electrolyzed-water generator 42 onto the surface to be cleaned and the amount of electrolyzed water supplied from the electrolyzed-water generator 42 to the wiping member 43. For instance, when the supply amount of the electrolyzed water sprayed on the floor surface is small, the electrolyzed water evaporates before the wiping member 43 is moistened. In such a case, dry wiping with the wiping member 43 continues. When the supply amount of the electrolyzed water sprayed onto floor surface is large, the electrolyzed water does not completely evaporate and the wiping member 43 is moistened. In such a case, dry wiping with the wiping member 43 eventually shifts from dry wiping to water wiping.

When the water wiping switch 24*d* is turned off, the electric vacuum cleaning apparatus 1 stops the power supply to the electrolyzed-water generator 42 and does not electrolyze water.

Figure 2:
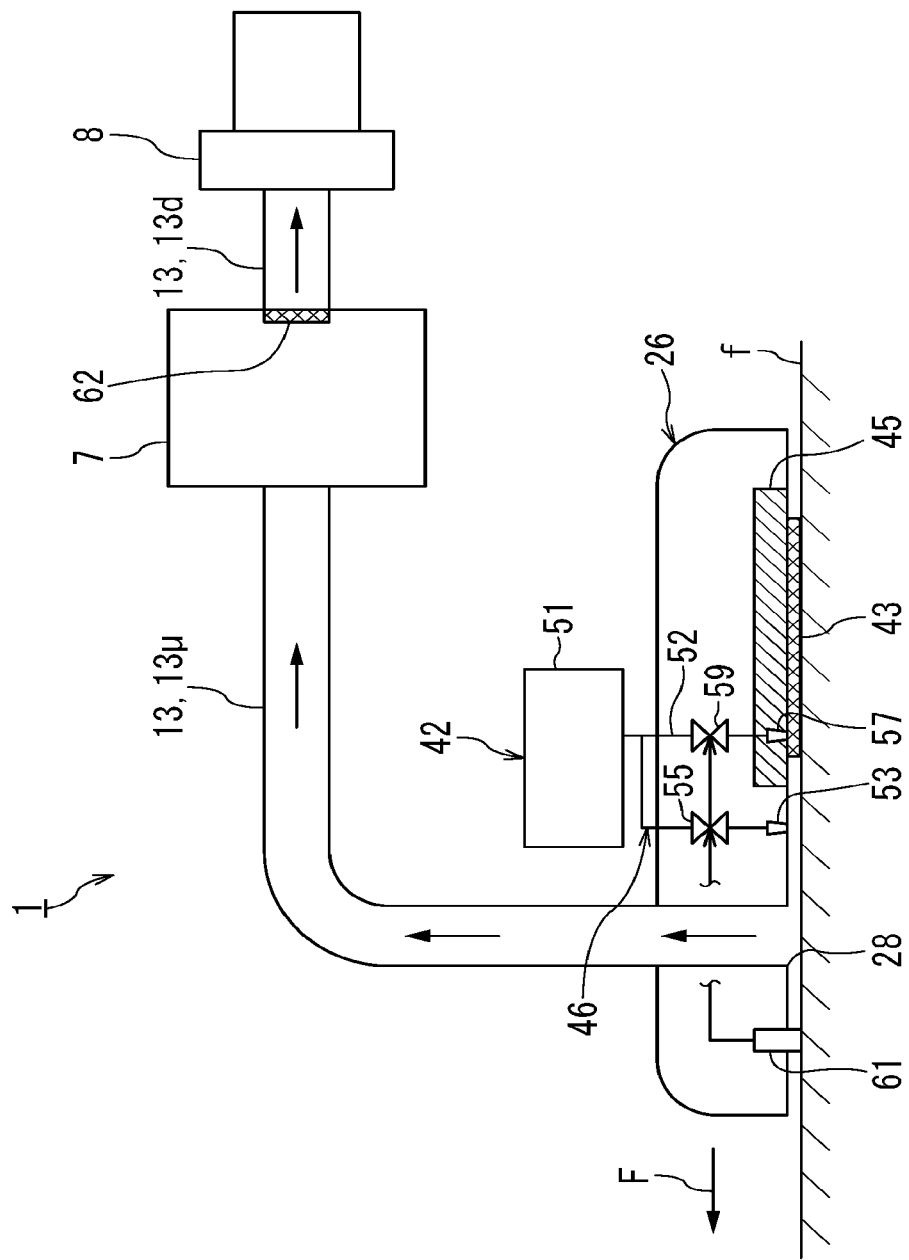
FIG. 2 is a schematic diagram illustrating the electric vacuum cleaning apparatus and its cleaning head according to the embodiment of the present invention.

FIG. 2 is a schematic diagram illustrating the electric vacuum cleaning apparatus and the cleaning head according to the embodiment of the present invention.

As shown in FIG. 2, the cleaning head 26 of the electric vacuum cleaning apparatus 1 according to the present embodiment includes: the electrolyzed-water generator 42; a wiping-member attachment 45 to which the wiping member 43 is detachably attached; and a supply mechanism 46 capable of supplying electrolyzed water to at least one of the wiping member 43 and the surface to be cleaned (hereinafter, referred to as the cleaning-target surface f).

In the advancing direction of the cleaning head 26 (solid arrow F in FIG. 2), the suction port 28 and the wiping member 43 are arranged in the front-and-back direction such that the suction port 28 is disposed on the front side of the wiping member 43. That is, the wiping member 43 is disposed behind the cleaning head 26. Thus, as the cleaning head 26 advances, the suction port 28 moves ahead of (i.e., in advance of) the wiping member 43. When the cleaning head 26 moves backward, the wiping member 43 moves ahead of the suction port 28.

When the hose 3 is attached to the cleaner body 2, the suction port 28 corresponds to the entrance of the suction air passage 13, i.e., the most upstream end of the suction air passage 13. The electric vacuum cleaning apparatus 1 sucks in dust from the suction port 28 of the cleaning head 26.

The suction air passage 13 includes an upstream air passage 13$u$ from the suction port to the dust separation device 7 and a downstream air passage 13$d$ from the dust separation device 7 to the electric blower 8.

The electrolyzed-water generator 42 electrolyzes water to produce electrolyzed water in which ozone is dissolved and/or electrolyzes brine to generate electrolyzed water in which hypochlorous acid (HClO) is dissolved, for instance. In Japan, under the Water Supply Law, tap water easily available at home contains chlorine. The electrolyzed-water generator 42 can easily produce electrolyzed water containing hypochlorous acid by electrolyzing salt water or water containing chlorine such as tap water in Japan. The electrolyzed-water generator 42 includes: a reservoir 51 capable of storing water; electrodes including a positive electrode and a negative electrode; and a power supply circuit configured to apply voltage to the electrodes by the power supplied through the power cord 11.

The reservoir 51 is a container for storing water and/or salt water. The water stored in the reservoir 51 may be tap water. In order to enhance the convenience of water supply, it is preferable that the reservoir 51 is detachable from the cleaner body 2. The reservoir 51 has a lid that can be opened and closed. The reservoir 51 can easily supply water and/or salt water by opening its lid.

For the electrodes of the electrolyzed-water generator 42, a material which hardly dissolves in water, such as titanium and/or platinum, is used. In order to promote electrolysis, a platinum group metal such as iridium, platinum, and ruthenium may be supported on the surfaces of the electrodes or the oxide of the platinum group metal may be supported on the surfaces of the electrodes. Chemical species such as hydrogen peroxide, active oxygen and OH radicals are generated in the electrolyzed water.

The electrodes are provided in the reservoir 51. The electrodes may be provided outside the reservoir 51, for example, in a pipe connecting the reservoir 51 and the supply mechanism 46. That is, the electrolyzed-water generator 42 may be a device that converts the water in the reservoir 51 into electrolyzed water. Additionally or alternatively, the electrolyzed-water generator 42 may be a device that converts water supplied from the reservoir 51 to the supply mechanism 46 into electrolyzed water before the water reaches the supply mechanism 46, i.e., in the process of reaching the supply mechanism 46.

The wiping member 43 is, for example, a woven fabric or a non-woven fabric. The material of the wiping member 43 is synthetic fiber that includes natural fiber such as cotton, regenerated fiber such as cellulose, polyester fiber, polyamide fiber such as nylon 6, nylon 66, and nylon 46, and polyolefin fiber such as polyethylene and polypropylene. The wiping member 43 may be a sponge. In addition, the wiping member 43 may integrally include a member made of super absorbent polymer (SAP). The super absorbent polymer is so-called absorbent polymer, superabsorbent resin, or polymer absorber. The wiping member 43 integrally equipped with a member made of super absorbent polymer can hold a larger amount of electrolyzed water.

The wiping-member attachment 45 is a base for fixing the sheet-shaped wiping member 43 with a surface fastener for attaching the wiping member 43 to the base, wrapping the wiping member 43 around the base, or inserting a part of the wiping member 43 into a slot of the base, for instance. The wiping-member attachment 45 brings the wiping member 43 into contact with the cleaning-target surface f when the cleaning head 26 is placed on the cleaning-target surface f. The wiping-member attachment 45 may also be detachable (removable) from the cleaning head 26.

The supply mechanism 46 includes: a supply pipe 52 for leading electrolyzed water from the reservoir 51; a first supply port 53 for spraying electrolyzed water onto the cleaning-target surface f; a first valve 55 provided in the middle of the supply pipe 52 for supplying electrolyzed water to the first supply port 53 and shutting off this supply to the first supply port 53; a second supply port 57 for supplying electrolyzed water to the back face of the wiping member 43; and a second valve 59 provided in the middle of the supply pipe 52 for supplying electrolyzed water to the second supply port 57 and shutting off this supply to the second supply port 57. The front face of the wiping member 43 is the face that contacts the cleaning-target surface f. The back face of the wiping member 43 is the face that is opposite to the front face and does not contact the cleaning-target surface f.

The first supply port 53 is, for example, a nozzle capable of spraying electrolyzed water. The first supply port 53 supplies electrolyzed water to part of the cleaning-target surface f sandwiched between the suction port 28 and the wiping member 43 when the cleaning head 26 is placed on the cleaning-target surface f. In other words, the supply mechanism 46 supplies electrolyzed water from the first supply port 53 to part of the cleaning-target surface f sandwiched between the suction port 28 and the wiping member 43 when the cleaning head 26 is placed on the cleaning-target surface f.

Plural first supply ports 53 may be provided. In this case, the first supply ports 53 are preferably arranged in a row in the width direction of the cleaning head 26, i.e., in the width direction of the wiping member 43, for instance. The first supply ports 53 arranged in this manner can spray electrolyzed water in a wider range as the suction port 28 advances. The first supply port 53 may be an elongated flat nozzle having a long side in the width direction of the cleaning head 26.

Plural second supply ports 57 may be provided. In this case, the second supply ports 57 are preferably arranged in a row in the width direction of the cleaning head 26, i.e. in the width direction of the wiping member 43, for instance. The second supply ports 57 arranged in this manner can wet a wide range of the wiping members 43 with electrolyzed water. The second supply port 57 may be an elongated flat opening having a long side in the width direction of the cleaning head 26.

There is a possibility that the electrolyzed water being sprayed from the supply mechanism 46 onto the cleaning-target surface f and the electrolyzed water being spread from the supply mechanism 46 onto the cleaning-target surface f via the wiping member 43 are sucked from the cleaning-target surface f into the suction air passage 13 by the negative pressure acting on the suction port 28 depending on the traveling direction of the cleaning head 26, i.e., depending on whether it moves forward or backward.

For this reason, when the suction port 28 moves ahead of the wiping member 43, the supply mechanism 46 supplies electrolyzed water to the cleaning-target surface f. When the wiping member 43 moves ahead of the suction port 28, the supply mechanism 46 shuts off the supply of electrolyzed water to the cleaning-target surface f.

Specifically, when the suction port 28 moves ahead of the wiping member 43, the first valve 55 supplies electrolyzed water to the first supply port 53 and the second valve 59 supplies electrolyzed water to the second supply port 57. Conversely, when the wiping member 43 moves ahead of the suction port 28, the first valve 55 shuts off the supply of electrolyzed water to the first supply port 53 and the second valve 59 shuts off the supply of electrolyzed water to the second supply port 57.

For detection of the traveling direction of the cleaning head 26, a known traveling-direction detector 61 is used. For instance, the traveling-direction detector 61 includes a lever that swings in response to forward movement and backward movement of the cleaning head 26 or caster that turns in response to forward movement and backward movement of the cleaning head 26. The traveling-direction detector 61 further includes a detector configured to detect a state of the lever or the caster. Synchronization or interlock between the traveling direction of the cleaning head 26 and opening/closing of each of the first valve 55 and the second valve 59 is performed by an electrical controller such as a microcomputer on the basis of the detection result outputted from the traveling-direction detector 61. The synchronization or interlock between the traveling direction of the cleaning head 26 and opening/closing of each of the first valve 55 and the second valve 59 may be performed by a mechanical mechanism that transmits movement of the lever or the caster to the first valve 55 and the second valve 59, such as a link mechanism, a slide mechanism, or a cam mechanism.

In the case of spraying electrolyzed water onto the cleaning-target surface f like the first supply port 53, there is a possibility that the sprayed electrolyzed water is sucked into the suction air passage 13 by the flow of air drawn into the suction port 28. In the case of spreading electrolyzed water onto the cleaning-target surface f with the wiping member 43 like the second supply port 57, there is a low risk that the electrolyzed water is drawn into the suction air passage 13 by the flow of air drawn into the suction port 28. Thus, the second valve 59 may continue to supply electrolyzed water to the second supply port 57 regardless of the traveling direction of the cleaning head 26.

The electric vacuum cleaning apparatus 1 further includes a moisture absorber 62 that is provided in the suction air passage 13 and absorbs moisture including electrolyzed water sucked into the suction air passage 13 due to suction vacuum pressure. When electrolyzed water is sucked into the suction air passage 13, the moisture absorber 62 absorbs moisture and prevents the moisture from reaching the electric blower 8 before the moisture reaches the electric blower 8. The moisture absorber 62 is, for example, a woven fabric or a non-woven fabric. The material of the moisture absorber 62 is synthetic fiber that includes natural fiber such as cotton, regenerated fiber such as cellulose, polyester fiber, polyamide fiber such as nylon 6, nylon 66, and nylon 46, and polyolefin fiber such as polyethylene and polypropylene. The moisture absorber 62 may be a sponge. In addition, the moisture absorber 62 may integrally include a member made of super absorbent polymer. The moisture absorber 62 integrally equipped with a member made of super absorbent polymer can hold a larger amount of electrolyzed water.

The moisture absorber 62 may be provided in the upstream air passage 13u of the suction air passage 13 or in the downstream air passage 13d of the suction air passage 13. The moisture absorber 62 may be provided inside the dust separation device 7. In addition to the function of absorbing moisture, the moisture absorber 62 may also function as a filter of the dust separation device 7 that separates dust from dust-containing air having been sucked into the suction air passage 13.

Further, the supply mechanism 46 may be configured such that the supply mechanism 46 includes only one of the first supply port 53 and the second supply port 57. In this case, it is sufficient that the supply mechanism 46 includes only one of the first valve 55 corresponding to the first supply port 53 and the second valve 59 corresponding to the second supply port 57.

Furthermore, the electrolyzed-water generator 42 may be provided anywhere on the hose 3 as long as the electrolyzed water can be supplied to the cleaning head 26. For instance, the electrolyzed-water generator 42 may be provided in the joint structure of the extension tube 25 connecting the cleaning head 26. In addition, the electrolyzed-water generator 42 may be provided at the bottom of the cleaner body 2 as long as the electrolyzed water can be supplied to the cleaning-target surface f.

Next, other aspects of the electric vacuum cleaning apparatus 1 according to the present embodiment will be described. In the electric vacuum cleaning apparatuses 1A and 1B described as the respective aspects, the same reference signs are assigned to the same components as the above-described electric vacuum cleaning apparatus 1 (i.e., first aspect of the electric vacuum cleaning apparatus), and duplicate description is omitted.

Figure 3:
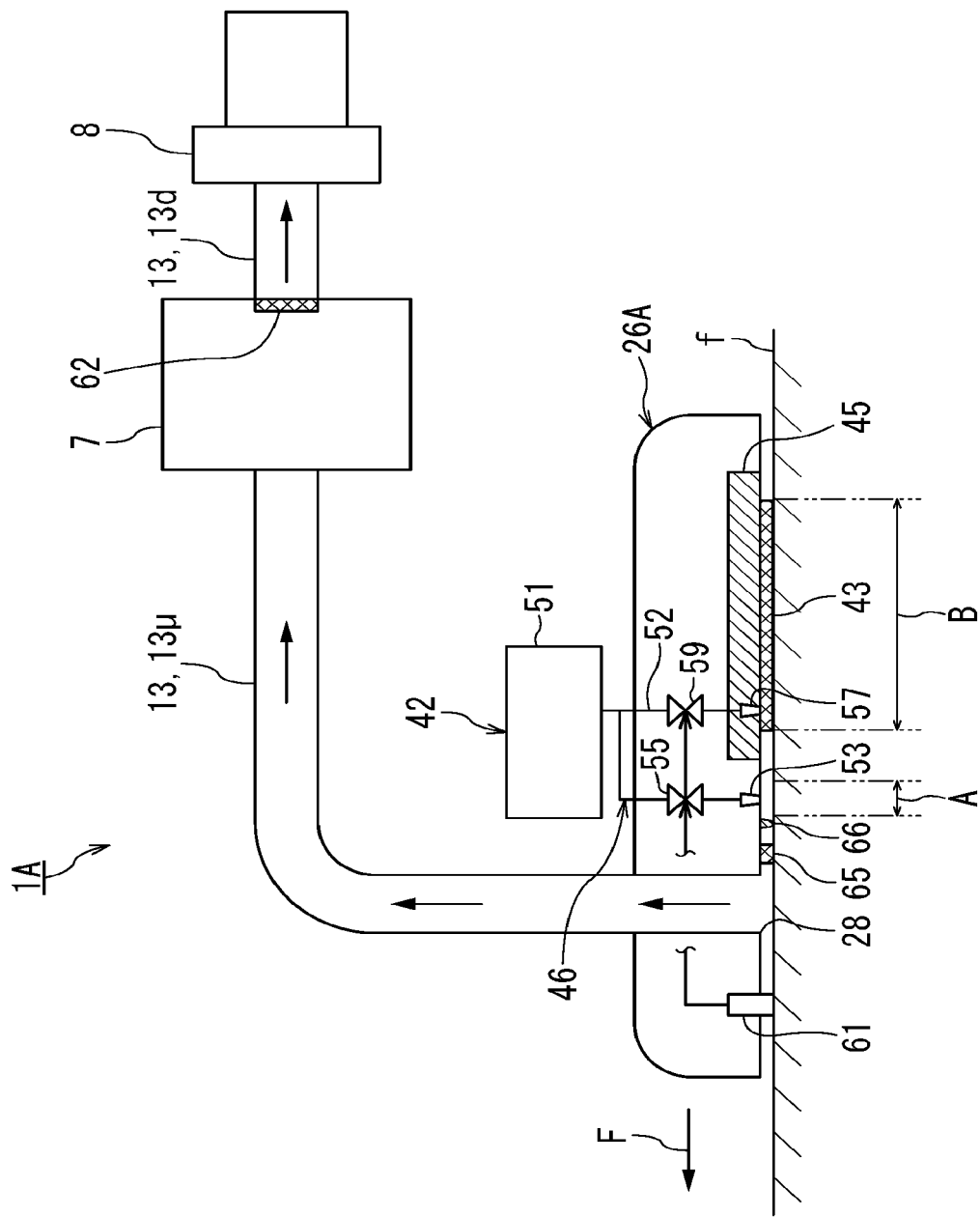
FIG. 3 is a schematic diagram illustrating a second aspect of the electric vacuum cleaning apparatus and its cleaning head according to the embodiment of the present invention.

FIG. 3 is a schematic diagram illustrating the second aspect of the electric vacuum cleaning apparatus and its cleaning head according to the embodiment of the present invention.

As shown in FIG. 3, the cleaning head 26A of the electric vacuum cleaning apparatus 1A according to the present embodiment (i.e., the second aspect of the electric vacuum cleaning apparatus) includes a wiper 65. This wiper 65 is disposed between the suction port 28 and the supply point of electrolyzed water from the supply mechanism 46 to the cleaning-target surface f when the cleaning head 26A is placed on the cleaning-target surface f, and can wipe off the electrolyzed water remaining on the cleaning-target surface f.

The above-described supply point of electrolyzed water from the supply mechanism 46 to the cleaning-target surface f means a spread region A of electrolyzed water on the cleaning-target surface f in the case of electrolyzed water being sprayed from the first supply port 53 onto the cleaning-target surface f. In the case of electrolyzed water being spread from the supply mechanism 46 to the cleaning-target surface f through the wiping member 43, the supply point of electrolyzed water from the supply mechanism 46 to the cleaning-target surface f means a spread region B of electrolyzed water on the cleaning-target surface f.

That is, the wiper 65 is provided closer to the suction port 28 than the spread region A and the spread region B. The wiper 65 is, for example, a brush, a woven fabric, or a non-woven fabric. The material of the wiper 65 is synthetic fiber that includes natural fiber such as cotton, regenerated fiber such as cellulose, polyester fiber, polyamide fiber such as nylon 6, nylon 66, and nylon 46, and polyolefin fiber such as polyethylene and polypropylene. The wiper 65 may be a sponge. In addition, the wiper 65 may integrally include a member made of super absorbent polymer. The wiper 65 absorber 62 integrally equipped with a member made of super absorbent polymer can hold a larger amount of electrolyzed water.

The wiper 65 may be detachably configured similarly to the wiping member 43. Moreover, it is preferable that the wiper 65 extends continuously over the entire width of the opening width of the suction port 28.

Before the electrolyzed water reaches the suction port 28, the wiper 65 sucks in the electrolyzed water approaching the suction port 28 as the cleaning head 26 moves, particularly the electrolyzed water remaining on the cleaning-target surface f.

Instead of or in addition to the wiper 65, the suction port body 26A may be provided with a shield 66 that is disposed between the suction port 28 and the supply point of the electrolytic water from the supply mechanism 46 to the cleaning-target surface f when the suction port 26A is placed on the cleaning-target surface f. This shield 66 prevents the electrolytic water, which is supplied to the supply point in at least a part of the space between the suction port 28 and the supply point, from moving to the suction port 28 by being in contact with the cleaning-target surface f.

The shield 66 prevents the electrolyzed water having adhered to the cleaning-target surface f from being sucked into the suction port 28 due to suction vacuum pressure. The shield 66 is provided closer to the suction port 28 than the spread region A and the spread region B. The shield 66 is, for example, a blade made of synthetic rubber such as natural rubber and silicone rubber. The shield 66 preferably extends continuously over the entire width of the opening of the suction port 28. Before the water containing the electrolyzed water adhered to the cleaning-target surface f reaches the suction port 28, the shield 66 scrapes this water like a squeegee.

It is sufficient that the cleaning head 26A includes any one of the wiper 65 and the shield 66. Either the wiper 65 or the shield 66 may be closer to the suction port 28. It is preferable that the wiper 65 and the shield 66 are spaced apart and arranged in parallel with each other. When the wiper 65 is closer to the suction port 28 than the shield 66, the amount of moisture absorbed by the wiper 65 is reduced and thus the wiping effect of the wiper 65 can be maintained longer.

Figure 4:
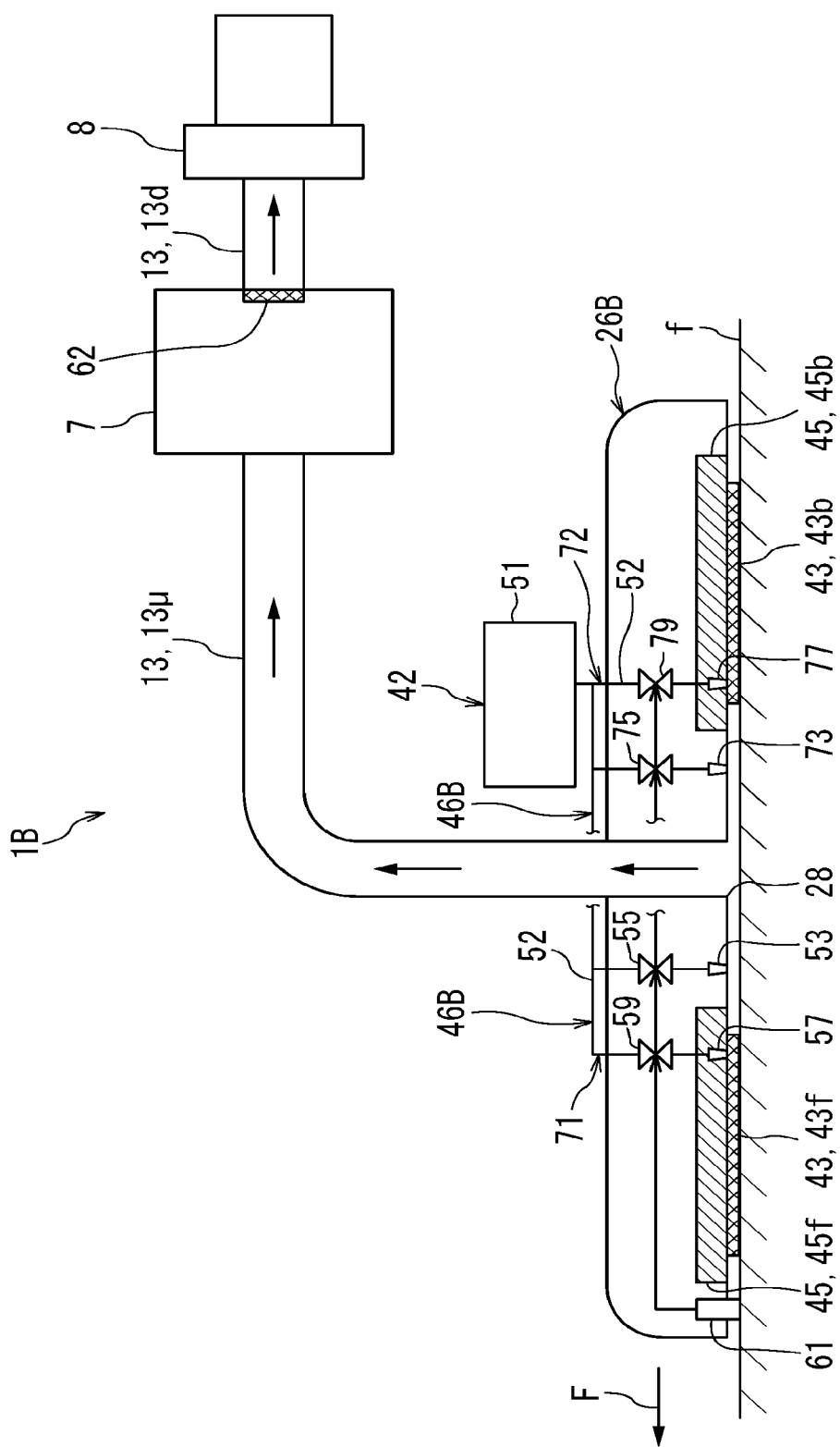
FIG. 4 is a schematic diagram illustrating a third aspect of the electric vacuum cleaning apparatus and its cleaning head according to the embodiment of the present invention.

FIG. 4 is a schematic diagram illustrating the third aspect of the electric vacuum cleaning apparatus and its cleaning head according to the embodiment of the present invention.

As shown in FIG. 4, the cleaning head 26B of the electric vacuum cleaning apparatus 1B (i.e., the third aspect of the electric vacuum cleaning apparatus) according to the present embodiment includes a pair of wiping-member attachment portions 45, between which the suction port 28 is interposed in the traveling direction of the cleaning head 26B.

In the advancing direction of the cleaning head 26B indicated by the solid arrow F in FIG. 4, the suction port 28 and the pair of wiping-member attachments 45 are arranged in the back-and-forth direction. The pair of wiping-member attachments 45 include a first wiping-member attachment 45f disposed on the front side of the suction port 28 and a second wiping-member attachment 45b disposed on the back side of the suction port 28. A first wiping member 43f is detachably attached to the first wiping-member attachment 45f, and a second wiping member 43b is detachably attached to the second wiping-member attachment 45b. That is, in the third aspect, two wiping members 43 are provided as the first wiping member 43f and the second wiping member 43b.

When the cleaning head 26B moves forward, the first wiping member 43f moves ahead of the suction port 28, and the suction port 28 moves ahead of the second wiping member 43b. When the cleaning head 26B moves backward, the second wiping member 43b moves ahead of the suction port 28, and the suction port 28 moves ahead of the first wiping member 43f.

Thus, when the suction port 28 moves ahead of the wiping member 43, the supply mechanism 46B supplies the electrolyzed water to the cleaning-target surface f. When the wiping member 43 moves ahead of the suction port 28, the supply mechanism 46B shuts off the supply of electrolyzed water to the cleaning-target surface f.

The supply mechanism 46B includes: the supply pipe 52 for leading electrolyzed water from the reservoir 51; a first system 71 configured to supply electrolyzed water to the first wiping member 43f; and a second system 72 configured to supply electrolyzed water to the second wiping member 43b.

The first system 71 includes; the first supply port 53 that sprays electrolyzed water onto part of the cleaning-target surface f sandwiched between the suction port 28 and the first wiping member 43f when the cleaning head 26B is placed on the cleaning-target surface f; the first valve 55 that is provided in the middle of the supply pipe 52 and switches between supply of electrolyzed water to the first supply port 53 and shut-off of this supply; the second supply port 57 that supplies electrolyzed water to the back surface of the first wiping member 43f; and the second valve 59 that is provided in the middle of the supply pipe 52 and switches between supply of electrolyzed water to the second supply port 57 and shut-off of this supply. The front face of the first wiping member 43f is the face that contacts the cleaning-target surface f. The back face of the first wiping member 43f is the face that is opposite to the front face and does not contact the cleaning-target surface f.

The second system 72 includes; a third supply port 73 that sprays electrolyzed water onto part of the cleaning-target surface f sandwiched between the suction port 28 and the second wiping member 43b when the cleaning head 26B is placed on the cleaning-target surface f; a third valve 75 that is provided in the middle of the supply pipe 52 and switches between supply of electrolyzed water to the third supply port 73 and shut-off of this supply; a fourth supply port 77 that supplies electrolyzed water to the back face of the second wiping member 43b; and a fourth valve 79 that is provided in the middle of the supply pipe 52 and switches between supply of electrolyzed water to the fourth supply port 77 and shut-off of this supply. The front face of the second wiping member 43b is the surface that contacts the cleaning-target surface f. The back face of the second wiping member 43b is the face that is opposite to the front face and does not contact the cleaning-target surface f.

As to switching operation of the first valve 55, when the suction port 28 moves ahead of the first wiping member 43f, the first valve 55 supplies electrolyzed water to the first supply port 53, and when the first wiping member 43f moves ahead of the suction port 28, the first valve 55 shuts off the supply of electrolyzed water to the first supply port 53. As to switching operation of the second valve 59, when the suction port 28 moves ahead of the first wiping member 43f, the second valve 59 supplies electrolyzed water to the second supply port 57, and when the first wiping member 43f moves ahead of the suction port 28, the second valve 59 shuts off the supply of electrolyzed water to the second supply port 57.

As to switching operation of the third valve 75, when the suction port 28 moves ahead of the second wiping member 43b, the third valve 75 supplies electrolyzed water to the third supply port 73, and when the second wiping member 43b moves ahead of the suction port 28, the third valve 75 shuts off the supply of electrolyzed water to the third supply port 73. As to switching operation of the fourth valve 79, when the suction port 28 moves ahead of the second wiping member 43b, the fourth valve 79 supplies electrolyzed water to the fourth supply port 77, and when the second wiping member 43b moves ahead of the suction port 28, the fourth valve 79 shuts off the supply of electrolyzed water to the fourth supply port 77.

That is, regardless of whether the cleaning head 26B is moving forward or backward, the electric vacuum cleaning apparatus 1B can spray or spread electrolyzed water onto the cleaning-target surface f.

Note that the second valve 59 and the fourth valve 79 may continue to respectively supply electrolyzed water to the second supply port 57 and the fourth supply port 77 regardless of the traveling direction of the cleaning head 26.

The first system 71 of the supply mechanism 46B may include only one of the first supply port 53 and the second supply port 57. In this case, it is sufficient that the first system 71 includes only one of the first valve 55 corresponding to the first supply port 53 and the second valve 59 corresponding to the second supply port 57. Similarly, the second system 72 of the supply mechanism 46B may include only one of the third supply port 73 and the fourth supply port 77. In this case, it is sufficient that the second system 72 includes only one of the third valve 75 corresponding to the third supply port 73 and the fourth valve 79 corresponding to the fourth supply port 77.

The supply mechanism 46B may include plural reservoirs 51. For instance, the electric vacuum cleaning apparatus 1B may be configured such that one reservoir 51 is connected to the first system 71 of the supply mechanism 46B and the other reservoir 51 is connected to the second system 72 of the supply mechanism 46B. Electrodes are provided in each of the reservoirs 51. The electrodes may be provided at an intensive generation place of electrolyzed water other than the reservoirs 61 so that the generated electrolyzed water is supplied from the intensive generation place to each of the plural reservoirs 51. Further, the electrodes may be provided in one selected reservoir 51 so that electrolyzed water is generated in the selected reservoirs 51 and distributed to the other reservoirs 51.

As described above, each of the electric vacuum cleaning apparatuses 1, 1A, 1B and the cleaning heads 26, 26A, 26B according to the present embodiment includes: the electrolyzed-water generator 42 that electrolyzes water to produce electrolyzed water containing hypochlorous acid by electrolyzing water; the wiping-member attachment 45 to which the wiping member(s) 43 is detachably attached; the supply mechanism 46 or 46B capable of supplying electrolyzed water to at least one of the wiping member 43 and the cleaning-target surface f. Consequently, the electric vacuum cleaning apparatuses 1, 1A, 1B can wipe the cleaning-target surface f with electrolyzed water.

Each of the electric vacuum cleaning apparatuses 1, 1A, 1B and the cleaning heads 26, 26A, 26B according to the present embodiment includes the supply mechanism 46. This supply mechanism 46 supplies electrolyzed water to the cleaning-target surface f when the suction port 28 moves ahead of the wiping member 43, and shuts off the supply of electrolyzed water to the cleaning-target surface f when the wiping member 43 moves ahead of the suction port 28. Consequently, the electric vacuum cleaning apparatuses 1, 1A, 1B achieve both of suction cleaning performed by driving the electric blower 8 and wiping with electrolyzed water, and eliminate or reduce electrolyzed water supplied to the cleaning-target surface f from being sucked into the suction air passage 13.

Additionally, the electric vacuum cleaning apparatus 1A and the cleaning head 26A according to the present embodiment include the wiper 65, which is disposed between the suction port 28 and the supply points (region A and region B) of electrolyzed water from the supply mechanism 46 to the cleaning-target surface f and can wipe off the electrolyzed water. Consequently, the electric vacuum cleaning apparatus 1A can more reliably suppress the electrolyzed water supplied to the cleaning-target surface f from being sucked into the suction air passage 13.

Further, the electric vacuum cleaning apparatus 1A and the cleaning head 26A according to the present embodiment include the shield 66, which is disposed between the suction port 28 and the supply points (region A and region B) of electrolyzed water from the supply mechanism 46 to the cleaning-target surface f and prevents the electrolyzed water from being sucked into the suction port 28 due to suction vacuum pressure. Consequently, the electric vacuum cleaning apparatus 1A can more reliably eliminate or reduce the electrolyzed water supplied to the cleaning-target surface f from being sucked into the suction air passage 13.

Moreover, each of the electric vacuum cleaning apparatuses 1, 1A, 1B and the cleaning heads 26, 26A, 26B according to the present embodiment includes the moisture absorber 62 that absorbs electrolyzed water sucked into the suction air passage 13 due to suction vacuum pressure. Consequently, the electric vacuum cleaning apparatuses 1, 1A, and 1B eliminate or reduce electrolyzed water from flowing into the electric blower 8.

Furthermore, each of the electric vacuum cleaning apparatuses 1, 1A, 1B and the cleaning heads 26, 26A, 26B according to the present embodiment supplies electrolyzed water to the back face of the wiping member 43. Consequently, the electric vacuum cleaning apparatuses 1, 1A, and 1B can perform water wiping on the cleaning-target surface f by using electrolyzed water. In addition, electrolyzed water soaked in the wiping member 43 is less likely to be sucked into the suction air passage 13 as compared with electrolyzed water directly sprayed onto the cleaning-target surface f. Consequently, the electric vacuum cleaning apparatuses 1, 1A, and 1B can easily achieve both of suction cleaning and water wiping.

Additionally, each of the electric vacuum cleaning apparatuses 1, 1A, 1B and the cleaning heads 26, 26A, 26B according to the present embodiment includes the water wiping switch 24d that receives an operation of switching between supply of electrolyzed water and shut-off of this supply in the supply mechanism 46 or 46B. Consequently, the electric vacuum cleaning apparatuses 1, 1A, and 1B can easily switch between implementation and non-implementation of cleaning with the use of electrolyzed water according to the user's intention.

Therefore, according to the electric vacuum cleaning apparatuses 1, 1A, 1B and the cleaning heads 26, 26A, 26B of the present embodiment as described above, it is possible to continuously perform both of suction cleaning for sucking in dust on the cleaning-target surface f and wiping, which can disinfect the cleaning-target surface f and remove dirt of organic matter such as sebum adhered to the floor surface, together.

While certain embodiments have been described, these embodiments have been presented by way of example only, and are n of intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric vacuum cleaning apparatus comprising:
   an electric blower that generates suction vacuum pressure;
   a suction air passage equipped with a suction port and fluidly connected to a suction side of the electric blower;
   an electrolyzed-water generator that electrolyzes water to produce electrolyzed water containing hypochlorous acid;
   a wiping-member attachment to which a wiping member is detachably attached, the wiping-member attachment being displaced from the suction port in forward and backward directions;
   a supply mechanism that supplies the electrolyzed water to a surface to be cleaned; and
   a rotatable brush arranged in the suction port to be shifted in the forward and backward directions with respect to the wiping member, wherein
   the supply mechanism is configured to
      supply the electrolyzed water to part of the surface to be cleaned sandwiched between the suction port and the wiping member attached to the wiping-member attachment,
      at a time of moving in the forward direction in which the suction port and the rotatable brush move ahead of the wiping member, supply the electrolyzed water to the surface to be cleaned so that the wiping member wipes off the electrolyzed water on the surface, and
      at a time of moving in the backward direction in which the wiping member moves ahead of the suction port and the rotatable brush, shut off supply of the electrolyzed water to the surface to be cleaned.

2. The electric vacuum cleaning apparatus according to claim 1, further comprising a wiper that is disposed between the suction port and a supply area of the electrolyzed water from the supply mechanism to the surface to be cleaned and can wipe off the electrolyzed water.

3. The electric vacuum cleaning apparatus according to claim 2, further comprising a shield disposed between the suction port and a supply area of the electrolyzed water from the supply mechanism to the surface to be cleaned,
   wherein the shield prevents the electrolyzed water, which is supplied to the supply area in at least a part of space between the suction port and the supply area, from sucking to the suction port by being in contact with the surface to be cleaned.

4. The electric vacuum cleaning apparatus according to claim 3, further comprising a moisture absorber that is provided in the suction air passage and absorbs the electrolyzed water sucked into the suction air passage due to the suction vacuum pressure.

5. The electric vacuum cleaning apparatus according to claim 2, further comprising a moisture absorber that is provided in the suction air passage and absorbs the electrolyzed water sucked into the suction air passage due to the suction vacuum pressure.

6. The electric vacuum cleaning apparatus according to claim 2,
   wherein the supply mechanism supplies the electrolyzed water to both of the surface to be cleaned and the wiping member.

7. The electric vacuum cleaning apparatus according to claim 2, further comprising an input unit configured to receive an operation of switching whether to permit supply of the electrolyzed water in the supply mechanism.

8. The electric vacuum cleaning apparatus according to claim 1, further comprising a shield disposed between the suction port and a supply area of the electrolyzed water from the supply mechanism to the surface to be cleaned,
   wherein the shield prevents the electrolyzed water, which is supplied to the supply area in at least a part of space between the suction port and the supply area, from sucking to the suction port by being in contact with the surface to be cleaned.

9. The electric vacuum cleaning apparatus according to claim 8, further comprising a moisture absorber that is provided in the suction air passage and absorbs the electrolyzed water sucked into the suction air passage due to the suction vacuum pressure.

10. The electric vacuum cleaning apparatus according to claim 8,
    wherein the supply mechanism supplies the electrolyzed water to both of the surface to be cleaned and the wiping member.

11. The electric vacuum cleaning apparatus according to claim 8, further comprising an input unit configured to receive an operation of switching whether to permit supply of the electrolyzed water in the supply mechanism.

12. The electric vacuum cleaning apparatus according to claim 1, further comprising a moisture absorber that is provided in the suction air passage and absorbs the electrolyzed water sucked into the suction air passage due to the suction vacuum pressure.

13. The electric vacuum cleaning apparatus according to claim 12,
    wherein the supply mechanism supplies the electrolyzed water to both of the surface to be cleaned and the wiping member.

14. The electric vacuum cleaning apparatus according to claim 12, further comprising an input unit configured to receive an operation of switching whether to permit supply of the electrolyzed water in the supply mechanism.

15. The electric vacuum cleaning apparatus according to claim 1,
    wherein the supply mechanism supplies the electrolyzed water to both of the surface to be cleaned and the wiping member.

16. The electric vacuum cleaning apparatus according to claim 15, further comprising an input unit configured to receive an operation of switching whether to permit supply of the electrolyzed water in the supply mechanism.

17. The electric vacuum cleaning apparatus according to claim 1, further comprising an input unit configured to receive an operation of switching whether to permit supply of the electrolyzed water in the supply mechanism.

* * * * *